UNITED STATES PATENT OFFICE.

HEINRICH HACKL AND HUGO BUNZEL, OF HEUFELD, GERMANY.

PROCESS OF MAKING PAINT.

1,175,751.	Specification of Letters Patent.	Patented Mar. 14, 1916.

No Drawing.	Application filed March 13, 1914. Serial No. 824,491.

*To all whom it may concern:*

Be it known that we, HEINRICH HACKL, a subject of the Emperor of Austria-Hungary, and HUGO BUNZEL, a subject of the King of Prussia, and residing both at Heufeld, Upper Bavaria, Germany, have invented certain new and useful Improvements in Processes of Making Paint; and we do hereby declare the following to be a full, clear, and exact description of the invention.

This invention relates to the manufacture of yellow to brown pigments from sulfid of iron.

Heretofore it has not been possible artificially to make yellow to yellowish brown pigments which could replace natural ocher with regard to purity of color, body, stability in oil and low price. It is true, that the yellow basic sulfates of iron are of a pure color, but they possess no body and change in color in oil. Hydrates of iron precipitated in the usual manner from solutions of ferric salts by means of hydroxids and carbonates are brown and flaky and these dry in the form of hard pieces. Titanate of ferric oxid or ferric titanate obtained by roasting is more expensive to manufacture than natural ocher. This last example also shows how great the demand is to make a product equivalent to natural ocher. These considerations have led to the present invention which is based on the idea that between red ferric oxid of good body and hydroxids which are rich in water and of poor body there must be yellow hydrates containing but little water and similar to ferric oxid with regard to its properties as a pigment. We have found that by introducing a solution of a ferric salt or of a ferrous salt, into a solution of an alkali metal sulfid or of an alkali earth metal sulfid, we can produce a hydrated sulfid of iron, and we can produce, by oxidation of said precipitate with air, an iron hydrate which possesses all the properties above mentioned so largely that natural ocher is excelled whether the sulfur is removed from the hydrate or not. As the purity of the color tone depends, of course, on the purity of the sulfid of iron it is important to make the latter from pure materials. Therefore neither crude gas-purifying mass nor the same purified from cyanogen compounds is suitable for this purpose as a rule.

Example: A solution of ferrous chlorid, such as may be obtained as a by product or waste solution, when etching or pickling iron, which in many factories is thrown away as worthless, to the detriment of the streams in the neighborhood, forms the starting material. For precipitating the sulfid of iron out of this liquor barium sulfid solution is advantageously used because both the chlorin of the iron solution and the barium of the sulfid solution are converted into the more valuable form of barium chlorid:

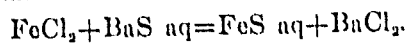

$FeCl_2 + BaS \text{ aq} = FeS \text{ aq} + BaCl_2.$

The hydrated sulfid of iron thus obtained is oxidized in a suitable vessel by treatment with air and the mixture consisting of ferric hydrate and sulfur is filtered and washed. The sulfur may be removed by known solvents, such as bisulfid of carbon, for example, or it may remain in the product. The precipitate freed in a suitable manner from adhering water forms the finished pigment. Its color fluctuates between yellow and yellowish brown and is determined largely by the temperature at which it was oxidized. Its covering power or body and fineness considerably excel those of natural ocher. The pigment thus produced is thereafter mixed with a suitable vehicle (such as oil, above referred to) in the usual or any approved manner, to produce a paint.

We claim as our invention:

1. A process of producing a paint, which comprises subjecting hydrated sulfid of iron, in the presence of moisture, to atmospheric oxidation, to produce a material containing ferric hydrate suitable for use as a pigment, and mixing the same with a paint vehicle.

2. A process of producing a paint which comprises subjecting hydrated sulfid of iron, to atmospheric oxidation to produce a pigment containing ferric hydrate, removing free sulfur from said material, by subjecting said material to the action of a solvent for sulfur, and thereafter mixing the same with a paint vehicle.

3. A process of making a paint which comprises adding a solution of an iron salt to a soluble sulfid, to precipitate a hydrated iron sulfid, and subjecting said precipitate in the presence of moisture, to atmospheric oxidation, to produce a pigment containing ferric hydrate, and thereafter mixing said pigment with a paint vehicle.

In testimony whereof we have signed our names to this specification, in the presence of two subscribing witnesses.

HEINRICH HACKL.
HUGO BUNZEL.

Witnesses:
A. W. VOIGT,
ARTHUR GUBE.